United States Patent
Stitt et al.

(10) Patent No.: US 10,956,343 B2
(45) Date of Patent: *Mar. 23, 2021

(54) MOBILE DE-WHITENING

(71) Applicants: DENSO International America, Inc., Southfield, MI (US); DENSO CORPORATION, Kariya (JP)

(72) Inventors: Raymond Michael Stitt, Ada, MI (US); Thomas Peterson, Holland, MI (US); Karl Jager, Holland, MI (US); Kyle Golsch, Pontiac, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,196

(22) Filed: Oct. 7, 2019

(65) Prior Publication Data

US 2020/0034315 A1 Jan. 30, 2020

Related U.S. Application Data

(63) Continuation of application No. 16/211,330, filed on Dec. 6, 2018, now Pat. No. 10,437,745.

(Continued)

(51) Int. Cl.
*G06F 13/12* (2006.01)
*H04L 9/32* (2006.01)
(Continued)

(52) U.S. Cl.
CPC ............. *G06F 13/12* (2013.01); *B60R 25/00* (2013.01); *G07C 9/00309* (2013.01);
(Continued)

(58) Field of Classification Search
None
See application file for complete search history.

(56) References Cited

U.S. PATENT DOCUMENTS 7,069,438 B2 * 6/2006 Balabine ................. A63F 13/12
713/168
7,907,735 B2 * 3/2011 Fascenda ............ H04L 63/0457
380/259

(Continued)

FOREIGN PATENT DOCUMENTS

BR 102014017465 A2 2/2016
CN 104574593 A 4/2015
(Continued)

*Primary Examiner* — Michael Sun
(74) *Attorney, Agent, or Firm* — Harness, Dickey & Pierce, P.L.C.

(57) ABSTRACT

Systems and methods are disclosed and include a processor configured to execute instructions stored in a nontransitory computer-readable medium. The instructions include generating first message authentication code (MAC) bytes based on a shared secret key. The instructions include generating first nonce bytes and an authenticated packet based on the first MAC bytes, the first nonce bytes, and a message byte. The instructions include generating a de-whitened tone byte based on the shared secret key. The instructions include generating a message packet that includes the authenticated packet and the de-whitened tone byte. Generating the message packet includes pseudo-randomly identifying a first location of the authenticated packet and inserting the de-whitened tone byte at the first location. The instructions include transmitting the message packet to the peripheral device and establishing the communication link between a portable device and a peripheral device in response to the peripheral device validating the message packet.

20 Claims, 16 Drawing Sheets

Related U.S. Application Data

(60) Provisional application No. 62/613,934, filed on Jan. 5, 2018.

(51) Int. Cl.
    *G07C 9/00*          (2020.01)
    *B60R 25/00*       (2013.01)
    *H04L 9/08*         (2006.01)

(52) U.S. Cl.
    CPC ............ *H04L 9/085* (2013.01); *H04L 9/0869* (2013.01); *H04L 9/3234* (2013.01); *H04L 9/3242* (2013.01); *H04L 9/3271* (2013.01); *G06F 2213/0024* (2013.01); *G07C 2009/00555* (2013.01); *G07C 2009/00769* (2013.01); *H04L 2209/805* (2013.01); *H04L 2209/84* (2013.01)

(56) References Cited

U.S. PATENT DOCUMENTS

| | | | |
|---|---|---|---|
| 9,209,969 B2 * | 12/2015 | Fascenda | H04L 9/0844 |
| 9,305,184 B2 * | 4/2016 | Mundra | G06F 7/588 |
| 9,688,247 B1 | 6/2017 | Jayaraman et al. | |
| 9,894,492 B1 | 2/2018 | Elangovan et al. | |
| 10,002,479 B2 | 6/2018 | Oz et al. | |
| 2004/0249974 A1 * | 12/2004 | Alkhatib | H04L 69/161 |
| | | | 709/245 |
| 2011/0215921 A1 | 9/2011 | Ben Ayed et al. | |
| 2012/0045058 A1 | 2/2012 | Weghaus | |
| 2014/0270163 A1 | 9/2014 | Merchan et al. | |
| 2014/0274013 A1 | 9/2014 | Santavicca | |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0100311 A1 * | 4/2016 | Kumar | H04W 4/80 |
| | | | 726/7 |
| 2016/0150407 A1 | 5/2016 | Michaud et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2019/0109713 A1 * | 4/2019 | Clark | H04L 9/3239 |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

* cited by examiner

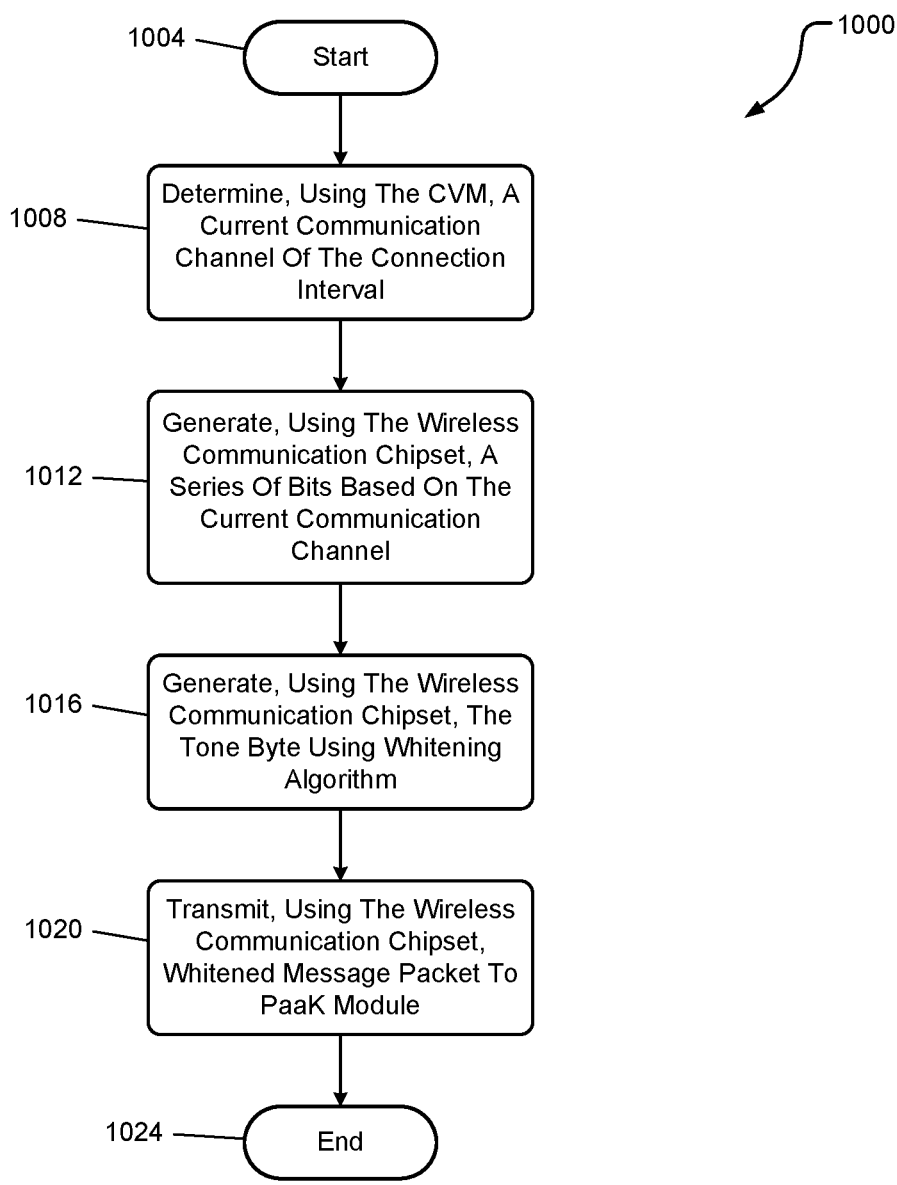

MOBILE DE-WHITENING

CROSS-REFERENCE TO RELATED APPLICATIONS

This application is a continuation of U.S. application Ser. No. 16/211,330 filed on Dec. 6, 2018, which claims the benefit of U.S. Provisional Application No. 62/613,934 filed on Jan. 5, 2018. The entire disclosure of the above applications are incorporated herein by reference.

FIELD

The present disclosure relates to systems and methods for establishing a secure communication link between a portable device and a peripheral device.

BACKGROUND

This section provides background information related to the present disclosure and is not necessarily prior art.

Traditionally, a passive entry/passive start (PEPS) system, which is a vehicle system that includes a keyless entry system, allows anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the key fob. If the key fob is authenticated and is located within an authorizing zone, the vehicle's function is made available to the user (e.g., doors are unlocked or vehicle is started).

Traditionally, PEPS systems use proprietary grade radio protocols using low frequency (LF) signals of approximately 125 kHz. PEPS systems are also hampered by the physics of the LF systems. LF was selected by early PEPS systems, because the wave propagation allows for relatively accurate estimation of range and location by using signal strength within the typical target activation range of 2 meters. However, due to the extremely long wavelength of the LF signal compared to the size of a practical vehicle antenna and key fob receiver, it is difficult within reasonable power consumption and safe transmit power levels to reliably communicate with a key fob using LF beyond a few meters. Consequently, it is difficult to make any of the vehicle's functions available to the user when the key fob is located more than a few meters away from the vehicle.

Accordingly, key fobs are being implemented by smart devices, such as smartphones and wearable devices, wherein the smart devices are able to communicate at a range greater than the activation range of LF systems. As such, smart devices enable the availability of various vehicle functions and long range distancing features, such as passive welcome lighting, distance bounding on remote parking applications, and so on.

However, traditional PEPS systems and PEPS systems with key fobs that are implemented by smart devices include wireless vulnerabilities that may subject the respective PEPS systems to malicious attacks. As an example, a user may attack a PEPS system by passive eavesdropping, man-in-the-middle (MITM) attacks, replay attacks, and identity tracking of various telemetric links of the PEPS system.

SUMMARY

This section provides a general summary of the disclosure, and is not a comprehensive disclosure of its full scope or all of its features.

The present disclosure provides a method for establishing a communication link between (i) a portable device that includes a processor that is configured to execute instructions stored in a nontransitory computer-readable medium and (ii) a peripheral device is disclosed. The method includes generating, using the processor of the portable device: first message authentication code (MAC) bytes based on a shared secret key; first nonce bytes; an authenticated packet based on the first MAC bytes, the first nonce bytes, and a message byte; a de-whitened tone byte based on the shared secret key; and a message packet that includes the authenticated packet and the de-whitened tone byte. Generating the message packet includes: pseudo-randomly identifying a first location of the authenticated packet; and inserting the de-whitened tone byte at the first location; transmitting, using the processor of the portable device, the message packet to the peripheral device; and establishing, using the processor of the portable device, the communication link between the portable device and the peripheral device in response to the peripheral device validating the message packet.

In some configurations, the method includes generating, using a processor of the peripheral device, second MAC bytes based on the shared secret key, wherein the processor of the peripheral device is configured to execute instructions stored in a nontransitory computer-readable medium. The method also includes generating, using the processor of the peripheral device, second nonce bytes.

In some configurations, validating the message packet includes removing, using the processor of the peripheral device, the de-whitened tone byte from the message packet. Validating the message packet also includes determining, using the processor of the peripheral device, that the message packet is authorized in response to the processor of the peripheral device determining that the first MAC bytes match the second MAC bytes.

In some configurations, validating the message packet includes determining, using the processor of the peripheral device, that the message packet is authorized in response to the processor of the peripheral device determining that the first nonce bytes match the second nonce bytes.

In some configurations, the method further comprises determining the message packet is invalid in response to one of: (i) determining, using the processor of the peripheral device, that the first MAC bytes do not match the second MAC bytes; and (ii) determining, using the processor of the peripheral device, that the first nonce bytes do not match the second nonce bytes.

In some configurations, the first nonce bytes are generated using a random number generator.

In some configurations, the first location is between a first MAC bit of the first MAC bytes and a second MAC bit of the first MAC bytes.

In some configurations, the first location is between a first nonce bit of the first nonce bytes and a second nonce bit of the first nonce bytes.

In some configurations, the first location precedes a location of one of the first nonce bytes and the first MAC bytes.

In some configurations, a location of the first nonce bytes and a location of the first MAC bytes precede the first location.

The present disclosure also provides a system that comprises a portable device that includes a processor configured to execute instructions stored in a nontransitory computer-readable medium. The instructions include generating, using the processor of the portable device: first message authentication code (MAC) bytes based on a shared secret key; first nonce bytes; an authenticated packet based on the first MAC bytes, the first nonce bytes, and a message byte; a de-whitened tone byte based on the shared secret key; and a message packet that includes the authenticated packet and the de-whitened tone byte. Generating the message packet includes: pseudo-randomly identifying a first location of the authenticated packet; and inserting the de-whitened tone byte at the first location; transmitting, using the processor of the portable device, the message packet to the peripheral device; and establishing, using the processor of the portable device, the communication link between the portable device and the peripheral device in response to the peripheral device validating the message packet.

In some configurations, the peripheral device includes a processor configured to execute second instructions stored in a second nontransitory computer-readable medium. The second instructions include generating, using the processor of the peripheral device, second MAC bytes based on the shared secret key. The second instructions also include generating, using the processor of the peripheral device, second nonce bytes.

In some configurations, validating the message packet includes removing, using the processor of the peripheral device, the de-whitened tone byte from the message packet. Validating the message packet also includes determining, using the processor of the peripheral device, that the message packet is authorized in response to the processor of the peripheral device determining that the first MAC bytes match the second MAC bytes.

In some configurations, validating the message packet includes determining, using the processor of the peripheral device, that the message packet is authorized in response to the processor of the peripheral device determining that the first nonce bytes match the second nonce bytes.

In some configurations, the instructions include determining the message packet is invalid in response to one of: (i) determining, using the processor of the peripheral device, that the first MAC bytes do not match the second MAC bytes; and (ii) determining, using the processor of the peripheral device, that the first nonce bytes do not match the second nonce bytes.

In some configurations, the first nonce bytes are generated using a random number generator.

In some configurations, the first location is between a first MAC bit of the first MAC bytes and a second MAC bit of the first MAC bytes.

In some configurations, the first location is between a first nonce bit of the first nonce bytes and a second nonce bit of the first nonce bytes.

In some configurations, the first location precedes a location of one of the first nonce bytes and the first MAC bytes.

In some configurations, a location of the first nonce bytes and a location of the first MAC bytes precede the first location.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 8-10 illustrate flowcharts of example control algorithms according to the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems, methods, and architecture to implement a localization system, such as a PEPS system, using a consumer grade wireless protocol. Specifically, the present disclosure relates to a PEPS system using a wireless communication protocol, such as a Bluetooth Low Energy (BLE) communication protocol, for communication between the vehicle and a portable device, such as a smartphone or a wearable device. The PEPS system includes a sensor network that is configured to find existing connections between the portable device and the vehicle and to measure the timing and signal characteristics of the communication between the portable device and the vehicle. Based on the timing and signal characteristics, the central module may determine the distance between the portable device and the vehicle. The PEPS system is also configured to perform a cryptographic operation to prevent an unauthorized device from executing a replay attack on the communication link between the vehicle and the portable device.

Figure 1:
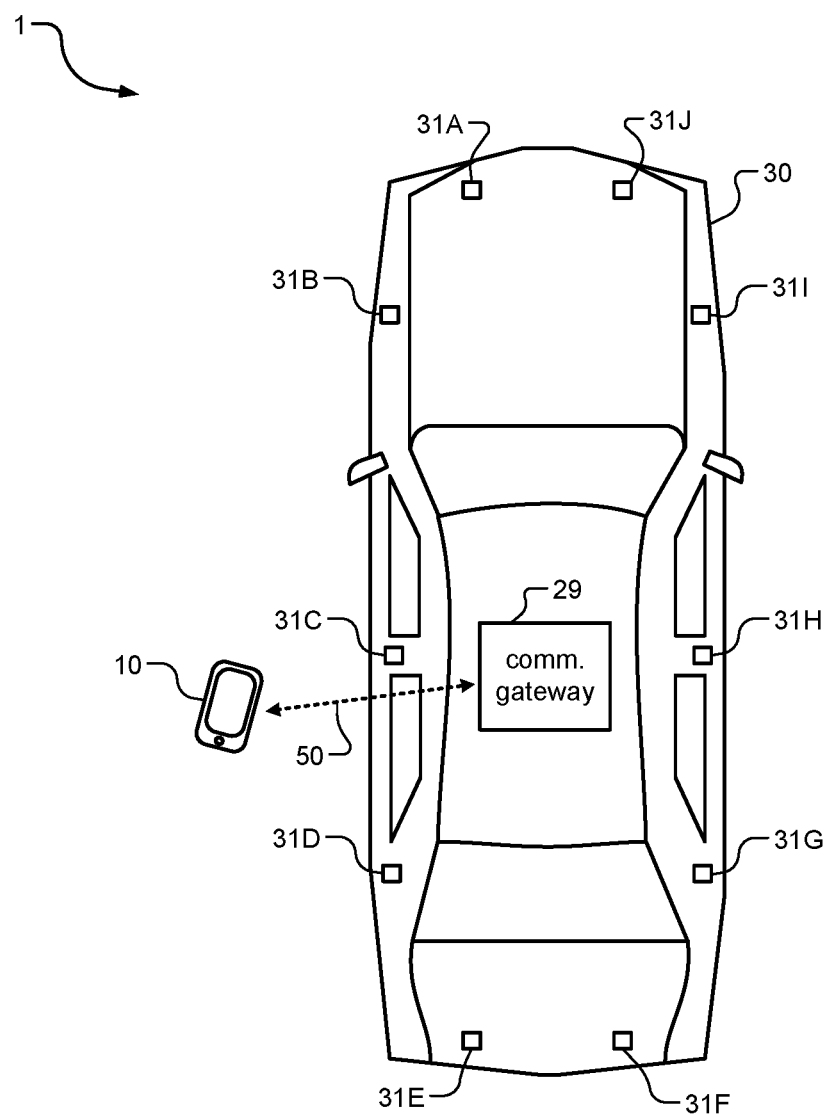
FIG. 1 is an illustration of a vehicle and a portable device according to the present disclosure.
Figure 2:
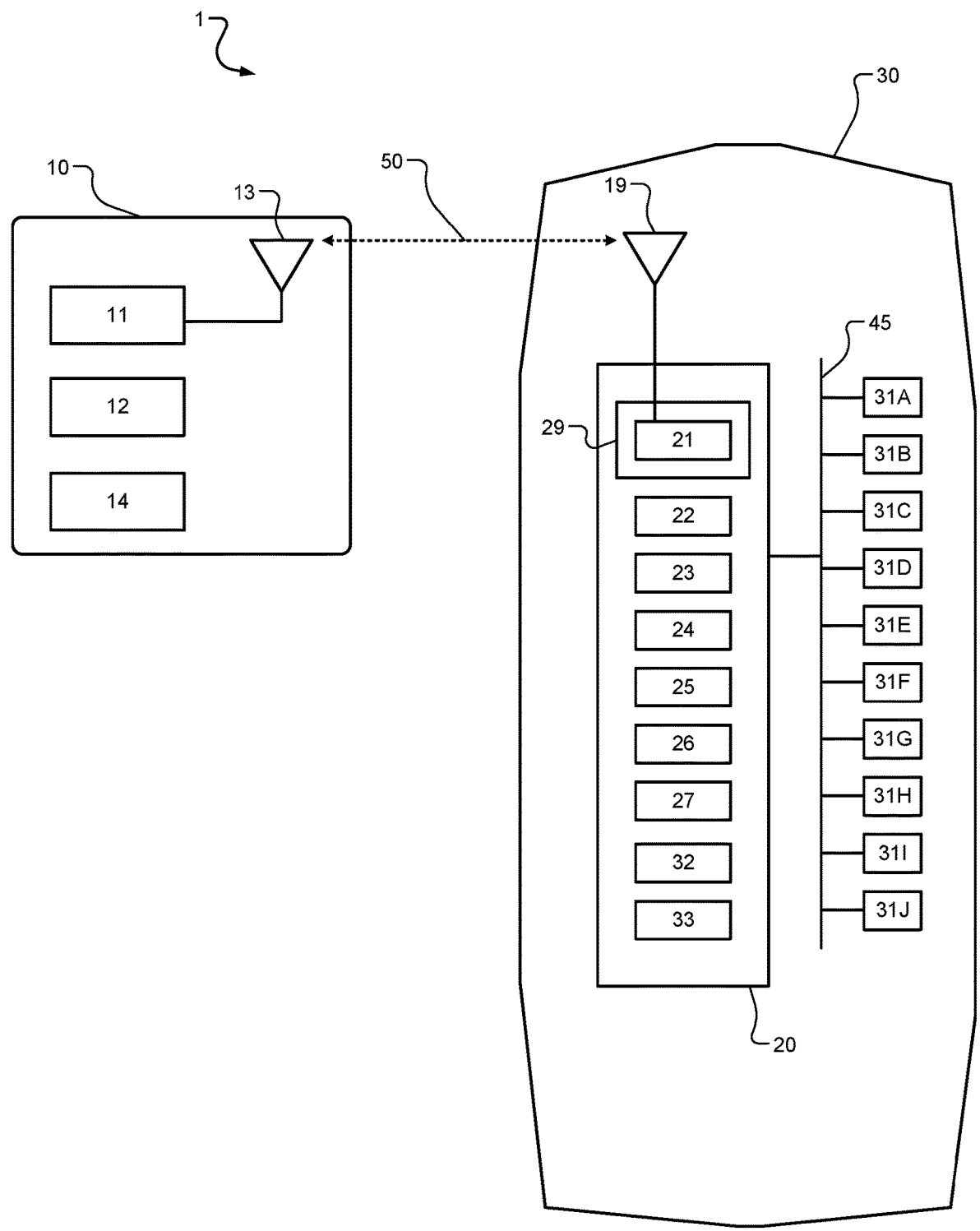
FIG. 2 is a functional block diagram of a vehicle and a portable device according to the present disclosure.

With reference to FIGS. 1-2, a PEPS system 1 is provided within a vehicle 30 and includes a communication gateway 29, a plurality of sensors 31A-31J (collectively referred to as sensors 31), and a control module 20. While FIGS. 1-2 illustrate ten sensors 31A-31J, any number of sensors may be used. Furthermore, while FIG. 2 illustrates one control module 20, the PEPS system 1 may include one or more control modules 20 that are distributed throughout the vehicle 30.

The one or more control modules 20 and the sensors 31 may communicate with each other using a vehicle interface 45. As an example, the vehicle interface 45 may include a controller area network (CAN) bus for communication between main modules. As another example, the vehicle interface 45 may include a local interconnect network (LIN) for lower data-rate communication. In other embodiments, the vehicle interface 45 may include a clock extension peripheral interface (CXPI) bus. Additionally or alternatively, the vehicle interface 45 may include any combination of the CAN bus, LIN, and CXPI bus communication interfaces.

The control module 20 includes the communication gateway 29, which includes a wireless communication chipset 21 connected to an antenna 19. For example, the wireless communication chipset 21 may be a Bluetooth low energy (BLE) communication chipset that utilizes the BLE communication protocol. Alternatively, other wireless communication protocols, such as Wi-Fi or Wi-Fi directed, may be used. As shown in FIG. 2, the antenna 19 may be located in the vehicle 30. Alternatively, the antenna 19 may be located outside of the vehicle 30 or within the control module 20. The control module 20 may also include a link authentication module 22 that authenticates a portable device 10 for communication via communication link 50. As an example, the link authentication module 22 may be configured to execute challenge-response authentication or other cryptographic verification algorithms in order to authenticate the portable device 10.

The control module 20 may also include a data management layer 23 for push data. As an example, the data management layer 23 is configured obtain vehicle information obtained by any of the modules (e.g., location information obtained by a telematics module 26) and transmit the vehicle information to the portable device 10.

The control module 20 may also include a connection information distribution module 24 that is configured to obtain information corresponding to the communication channels and channel switching parameters of the communication link 50 and transmit the information to the sensors 31. In response to the sensors 31 receiving the information from the connection information distribution module 24 via the vehicle interface 45 and the sensors 31 being synchronized with the communication gateway 29, the sensors 31 may locate and follow, or eavesdrop on, the communication link 50.

The control module 20 may also include a timing control module 25, which obtains timing information corresponding to the communication link 50 when the link authentication module 22 executes challenge-response authentication. Furthermore, the timing control module 25 is configured to provide the timing information to the sensors 31 via the vehicle interface 45.

The control module 20 may also include the telematics module 26, which is configured to generate location information and/or error of location information associated with the vehicle 30. The telematics module 26 may be implemented by a global navigation satellite system (e.g., GPS), inertial navigation system, global system for mobile communication (GSM) system, or other location system.

The control module 20 may also include a security filtering module 33 that is configured to detect violations of the physical layer and protocol and filter the data accordingly before providing the information to a sensor processing and localization module 32. The security filtering module 33 may also be configured to flag data as injected so that the sensor processing and localization module 32 may discard the flagged data and alert the PEPS system 1. The data from the sensor processing and localization module 32 is provided to a PEPS module 27, which is configured to read vehicle state information from the sensors 31 in order to detect user intent to access a vehicle function and to compare the location of the portable device 10 to the set of locations that authorize certain functions, such as unlocking a door of the vehicle 30 and/or starting the vehicle 30.

In order to carry out the above functionality of the various modules described above, the control module 20 may also include one or more processors that are configured to execute instructions stored in a nontransitory computer-readable medium, such as a read-only memory (ROM) and/or random access memory (RAM).

As shown in FIGS. 1-2, the portable device 10 may communicate with the communication gateway 29 of the vehicle 30 via the communication link 50. Without limitation, the portable device 10 may be, for example, any Bluetooth-enabled communication device, such as a smart phone, smart watch, wearable electronic device, key fob, tablet device, Bluetooth transmitter device, or other device associated with a user of the vehicle 30, such as an owner, driver, passenger of the vehicle 30, and/or a technician for the vehicle 30. Additionally or alternatively, the portable device 10 may be configured for wireless communication via another wireless communication protocol, such as Wi-Fi and/or Wi-Fi direct. The communication link 50 may be a Bluetooth communication link as provided for and defined by the Bluetooth specification. As an example, the communication link 50 may be a BLE communication link. Alternatively, the communication link 50 may be a Wi-Fi or Wi-Fi direct communication link.

The portable device 10 may include a wireless communication chipset 11 connected to an antenna 13. The wireless communication chipset 11 may be a BLE communication chipset. Alternatively, the wireless communication chipset 11 may be a Wi-Fi or Wi-Fi direct communication chipset. The portable device 10 may also include application code 12 that is executable by the processor of the portable device 10 and stored in a nontransitory computer-readable medium, such as a read-only memory (ROM) or a random-access memory (RAM). Based on the application code 12 and using the wireless communication chipset 11 and the antenna 13, the portable device 10 may be configured to execute various instructions corresponding to, for example, authentication of the communication link 50, transmission of location and/or velocity information obtained by a global navigation satellite system (e.g., GPS) sensor or accelerometer of the portable device 10, and manual activation of a vehicle function.

The portable device 10 may also include a cryptographic verification module (CVM) 14, which may be implemented by application code that is executable by the processor of the portable device 10 and stored in a nontransitory computer-readable medium, such as a read-only memory (ROM) or a random-access memory (RAM). The CVM 14 is described below in further detail with reference to FIGS. 6-8.

Figure 3:
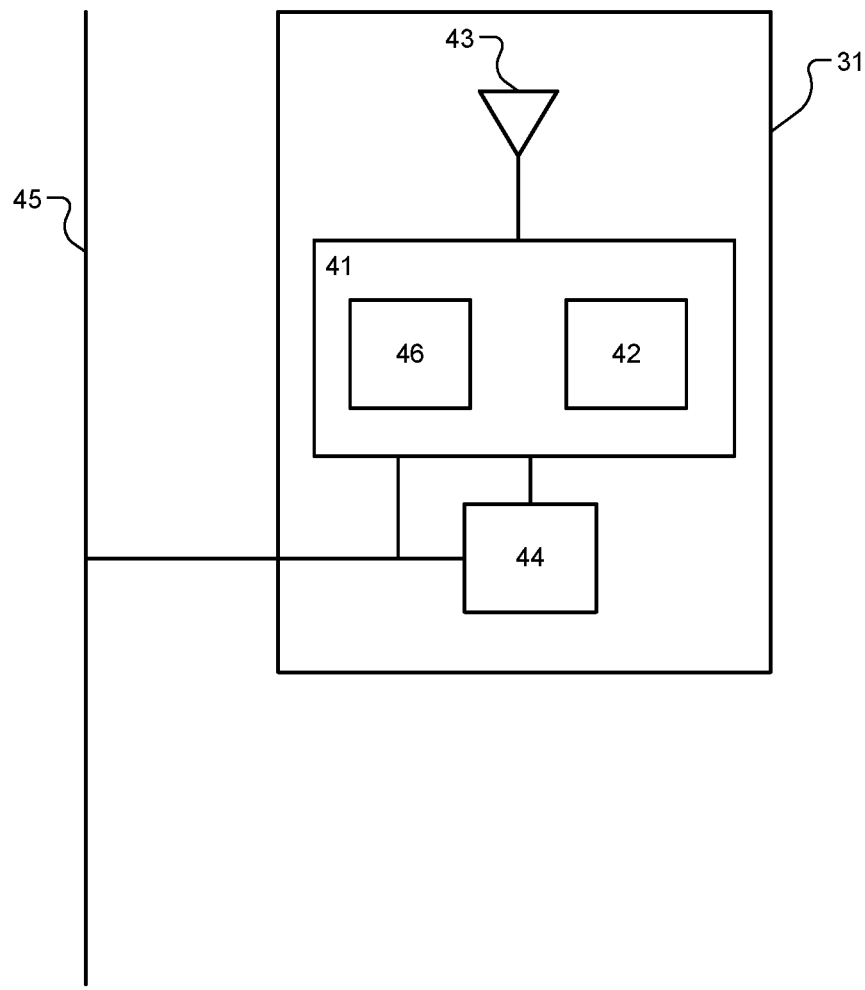
FIG. 3 is a functional block diagram of a sensor of a vehicle according to the present disclosure.

With reference to FIG. 3, each of the sensors 31 includes a wireless communication chipset 41 connected to an antenna system 43. The wireless communication chipset 41 may be a BLE communication chipset. Alternatively, the wireless communication chipset 41 may be a Wi-Fi or Wi-Fi direct communication chipset. As shown in FIG. 3, the antenna system 43 may be located internal to the sensors 31. Alternatively, the antenna system 43 may be located external to the sensors 31.

The control module 20 and, more specifically, the communication gateway 29, can establish a secure communication connection, such as communication link 50, with the portable device 10. For example, the control module 20 can establish a secure communication connection using the BLE communication protocol. The control module 20 can then communicate information about the secure communication connection, such as timing and synchronization information, to each of the sensors 31. For example, the control module 20 can communicate information about the secure communication connection, such as the timing of the next communication connection event, the timing interval between communication connection events, the communication channel for the next communication connection event, a channel map, a channel hop interval or offset to calculate the channel for subsequent communication connection events, communication latency information, communication jitter information, etc. The sensors 31 can then eavesdrop on communication packets sent by the portable device to the control module 20 and can measure signal information of the signals received from the portable device 10. For example, the sensors 31 can measure the received signal strength and determine a received signal strength indicator (RSSI) value. Additionally or alternatively, the sensors 31 can determine other measurements of the signals received from the portable device 10, such as an angle of arrival, a time of arrival, a time difference of arrival, etc.

The sensors 31 can then communicate the measured information to the control module 20, which can then determine a location of the portable device 10 or a distance to the portable device 10 based on the measured information received from each of the sensors 31. For example, the control module 20 can determine the location of the portable device 10 based on, for example, the patterns of the RSSI values for the various signals received from the portable device 10 by the various sensors 31. For example, a relatively strong RSSI generally indicates that the portable device 10 is closer and a relatively weak RSSI generally indicates that the portable device 10 is farther away. By analyzing the RSSI for communication signals sent by the portable device 10 with each of the sensors 31, the control module 20 can determine a location of or distance to the portable device 10 relative to the vehicle 30. Additionally or alternatively, angle of arrival or time difference of arrival measurements for the signals sent by the portable device 10 and received by the sensors 31 can also be used by the control module 20 to determine the location of the portable device 10. Additionally or alternatively, the sensors 31 themselves can determine a location of the portable device 10 or distance to the portable device 10 based on the measured information and can communicate the location or distance to the control module 20.

Based on the determined location or distance of the portable device 10 relative to the vehicle 30, the PEPS system 1 can then authorize or perform a vehicle function, such as unlocking a door of the vehicle 30, unlocking a trunk of the vehicle 30, starting the vehicle 30, and/or allowing the vehicle 30 to be started. For example, if the portable device 10 is less than a first distance threshold to the vehicle 30, the PEPS system 1 can activate interior or exterior lights of the vehicle 30. If the portable device 10 is less than a second distance threshold to the vehicle, the PEPS system 1 can unlock doors or a trunk of the vehicle 30. If the portable device 10 is located inside of the vehicle 30, the PEPS system 1 can allow the vehicle 30 to be started.

With continued reference to FIG. 3, when the BLE communication protocol is used, the sensors 31 receive BLE signals using the antenna system 43 and, specifically, receive BLE physical layer messages using a BLE physical layer (PHY) controller 46. The sensors 31 can be configured to observe BLE physical layer messages and obtain measurements of the physical properties of the associated signals, including, for example, the received signal strength indication (RSSI) using a channel map that is produced by a channel map reconstruction module 42. Additionally or alternatively, the sensors 31 may communicate with each other and/or communicate with the communication gateway 29 via the vehicle interface 45 to determine time difference of arrival, time of arrival, or angle of arrival data for signals received by multiple sensors 31.

A timing synchronization module 44 is configured to accurately measure the reception times of messages on the vehicle interface 45 and pass the timing information to the wireless communication chipset 41. The wireless communication chipset 41 is configured to tune the PHY controller 46 to a specific channel at a specific time based on the channel map information and the timing signals. Furthermore, when the BLE communication protocol is used, the wireless communication chipset 41 is configured to observe all physical layer messages and data that conform to the Bluetooth physical layer specification, which includes the normal data rates proposed or adopted in, for example, the Bluetooth Specification version 5.0. The data, timestamps, and measured signal strength may be reported by the wireless communication chipset 41 to the various modules of the control module 20 via the vehicle interface 45.

Figure 4:
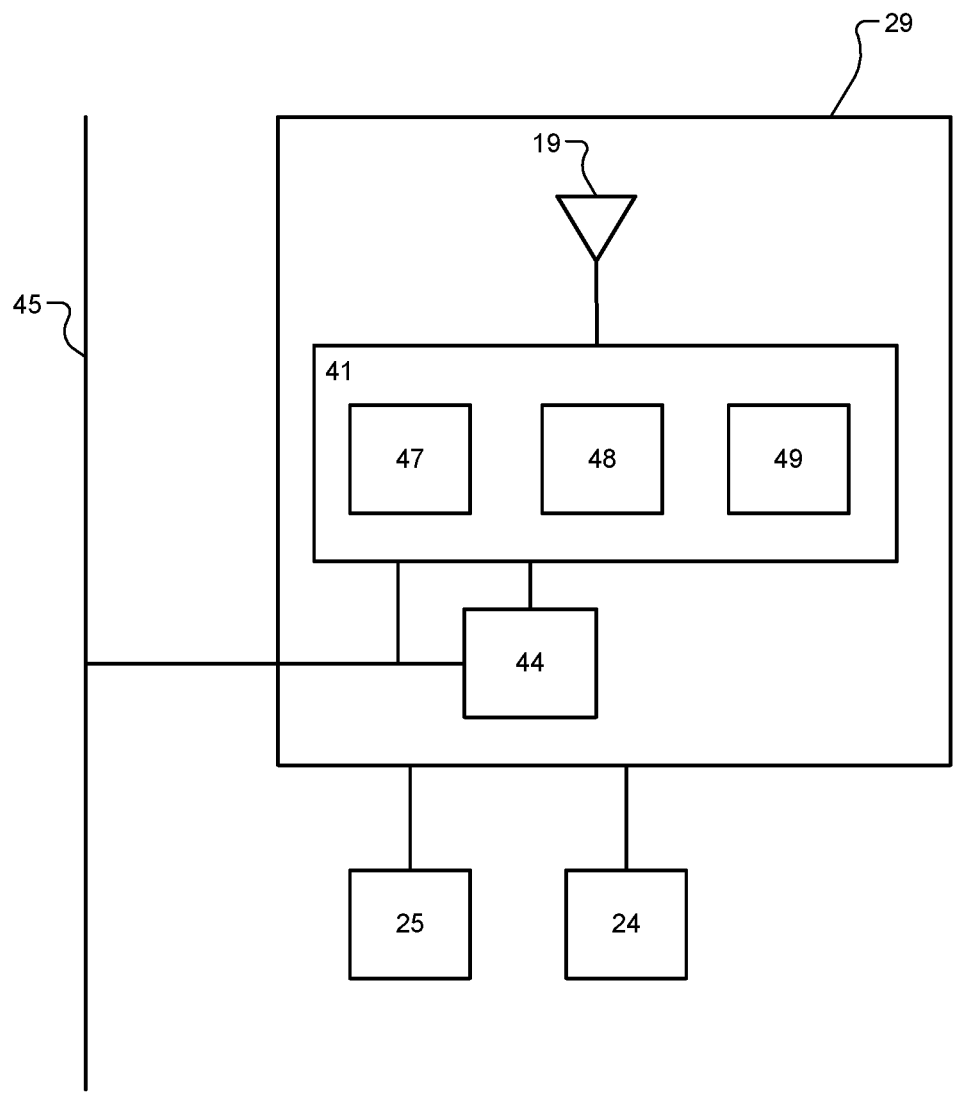
FIG. 4 is a functional block diagram of a communication gateway of a vehicle according to the present disclosure.

With reference to FIG. 4, the communication gateway 29 includes the wireless communication chipset 41 connected to an antenna 19 to receive BLE signals. When the BLE communication protocol is used, the wireless communication chipset 41 implements a Bluetooth protocol stack 48 that is, for example, compliant with the BLE specification (i.e., Bluetooth Specification version 5.0). The wireless communication chipset 41 may also include an application 47 implemented by application code that is executable by a processor of the wireless communication chipset 41. Additionally or alternatively, the application 47 may be executable by a processor of the control module 20 and may be stored in a nontransitory computer-readable medium of the control module 20.

The application 47 may include code corresponding to modifications outside of the Bluetooth specification to enable the wireless communication chipset 41 to inspect timestamped data transmitted and received by the wireless communication chipset 41, regardless of the validity of the data. For example, the application 47 enables the wireless communication chipset 41 to compare transmitted and received data against expectations. The communication gateway 29 is configured to transmit the actual transmitted and received data to the various modules of the control module 20 via the vehicle interface 45. Alternatively, the communication gateway 29 may be configured to receive the data from each of the sensors 31 via the vehicle interface 45. The application 47 may be further configured to enable the wireless communication chipset 41 to confirm that each of the sensors 31 has received the correct data at the correct time.

The Bluetooth protocol stack 48 is configured to provide the channel map, access identifier, next channel, and the time to the next channel to the application 47. The Bluetooth protocol stack 48 is configured to output timing signals for the timestamps of transmission and reception events to the application 47 and/or a digital PIN output of the wireless communication chipset 41. The communication gateway 29 also includes the timing synchronization module 44, which is configured to accept the timing signals and works in conjunction with the vehicle interface 45 to create accurate time stamps of connection information messages and other communications.

With continued reference to FIG. 4, the communication gateway 29 may provide timing information and channel map information to the timing control module 25 and, respectively. The communication gateway 29 may be configured to provide information corresponding to ongoing connections to the connection information distribution module 24 and timing signals to the timing control modules 25 so that the sensors 31 can find and follow, or eavesdrop on, the communication link 50.

Additionally, the wireless communication chipset 41 includes a phone-as-a-key (PaaK) module 49, which is implemented by application code that is executable by the processor of the control module 20 and stored in a nontransitory computer-readable medium, such as a read-only memory (ROM) or a random-access memory (RAM). The PaaK module 49 is described below in further detail with reference to FIGS. 6-8.

Figure 5:
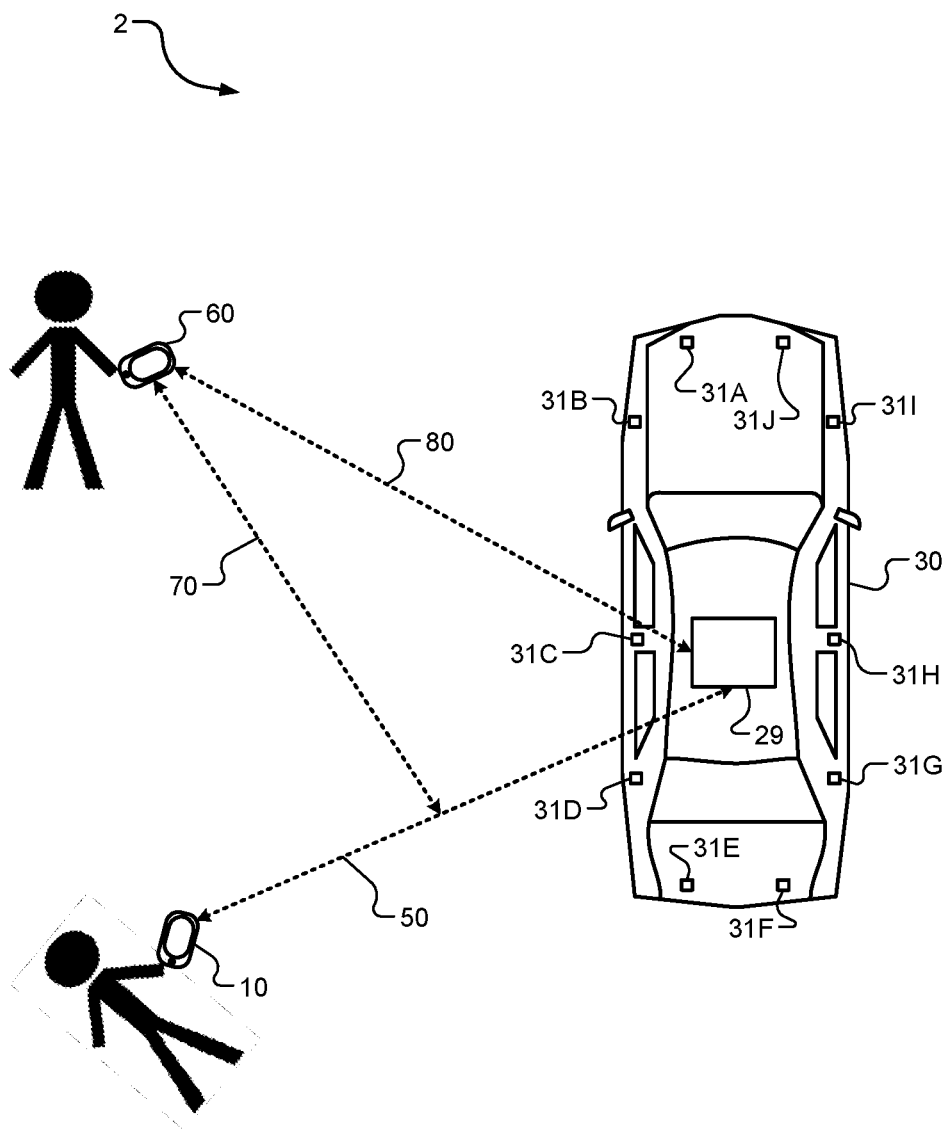
FIG. 5 illustrates an unauthorized device attacking a communication link between a portable device and a vehicle according to the present disclosure.

With reference to FIG. 5, PEPS system 2 is provided and includes the vehicle 30, the communication gateway 29, and the sensors 31. As described above, the sensors 31 are configured to take measurements of the physical properties of the wireless signal transmitted by the portable device 10 to the communication gateway 29 via the communication link 50. The sensors 31 may measure, for example, the angle of arrival (AoA) of the wireless signals transmitted via the communication link 50. In response to the control module 20 receiving the AoA measurements from the sensors 31, the control module 20 may determine the location of the portable device 10, the distance between the portable device 10 and the vehicle 30, and/or trajectory of the portable device 10 based on the AoA measurements received from the sensors 31.

Based on the location of the portable device 10, the distance between the portable device 10 and the vehicle 30, and/or trajectory of the portable device 10, the control module 20 may activate certain vehicle functions, such as setting mirror positions, adjusting a steering wheel position, adjusting a seat position of a driver, modifying climate control settings, adjusting audio/media settings, unlocking a door of the vehicle, unlocking a trunk of the vehicle, activating a lighting system of the vehicle, starting the vehicle, etc.

In one embodiment, an unauthorized device 60 may be configured to manipulate signals of and/or directly inject signals into the vehicle interface 45 via the communication link 50 based on wireless vulnerabilities of the PEPS system 1. As an example, the unauthorized device 60 may be configured to execute a replay attack, as indicated by dashed arrows 70, 80, on the communication link 50 in order to transmit and/or receive messages from the control module 20. As such, a user of the unauthorized device 60 may fraudulently and/or maliciously activate or obtain access to certain vehicle functions.

Figure 6:
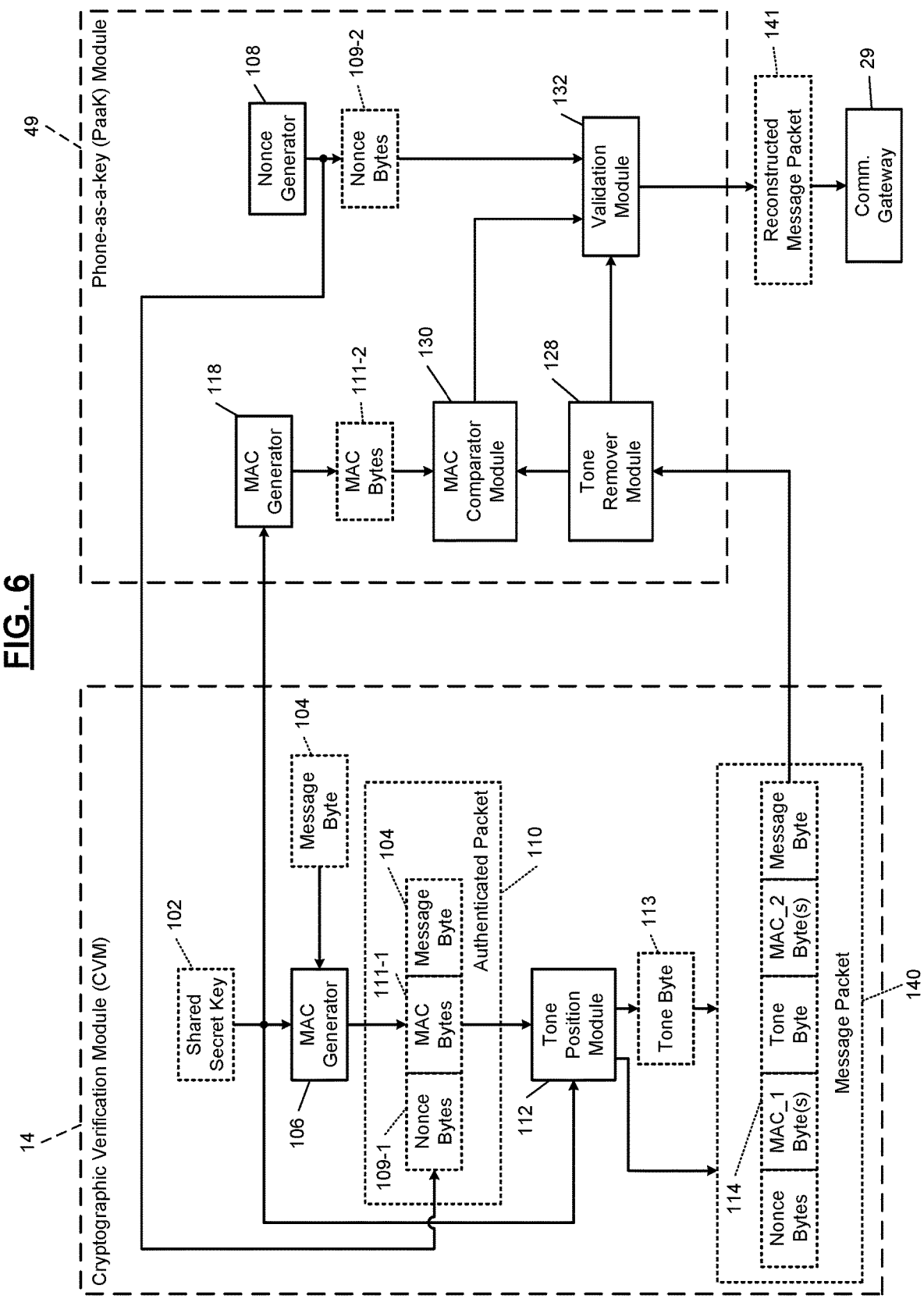
FIG. 6 illustrates a functional block diagram of a cryptographic verification module and a phone-as-a-key (PaaK) module according to the present disclosure.

With reference to FIG. 6, a functional block diagram of the CVM 14 and the PaaK module 49 is shown. The CVM 14 may include a message authentication code (MAC) generator 106 and a tone position module 112. The PaaK module 49 may include a nonce generator 108, a MAC generator 118, a tone remover module 128, a MAC comparator module 130, and a validation module 132.

In order to establish the communication link 50 and subsequently transmit message byte 104 to the communication gateway 29 via the PaaK module 49, the CVM 14 is configured to insert tone byte 113 (e.g., a de-whitened tone byte) at a random or pseudo-random location of a payload 114 of a message packet 140. Subsequently, the PaaK module 49 provides the message byte 104 to the communication gateway 29 if, for example, the PaaK module 49 is able to remove the tone byte 113 from the payload 114 and verify the authenticity and integrity of other portions of the payload 114, as described below in further detail.

In one example embodiment, the CVM 14 is configured to generate an authenticated packet 110, which includes the message byte 104, MAC bytes 111-1 generated by the MAC generator 106, and nonce bytes 109-1 generated by the nonce generator 108. The MAC generator 106 is configured to protect and/or guarantee the integrity or authenticity of the data in the message byte 104. In some embodiments, the MAC generator 106 is configured to generate the MAC bytes 111-1 using, for example, a symmetric encryption or decryption algorithm, such as an advanced encryption standard (AES) or a hash-based message authentication algorithm (HMAC). As a specific example, the MAC generator 106 may generate the MAC bytes 111-1 based on a first portion of a shared secret key 102 and the message byte 104.

The nonce generator 108 is configured to generate nonce bytes 109-1, 109-2, which are random or pseudo-random numbers (e.g., a 32 byte value). Specifically, when nonce bytes 109-1 are combined with the MAC bytes 111-1 and the message byte 104, the communication link 50 may avoid being subjected to replay attacks.

The tone position module 112 is configured to, based on a second portion of the shared secret key 102, the authenticated packet 110, and/or the communication channel, generate and pseudo-randomly insert the tone byte 113 (e.g., the de-whitened tone byte) into the authenticated packet 110 in order to generate the payload 114. The tone position module 112 may insert the tone byte 113 at any location within the authenticated packet 110, including, for example, after one of the nonce bytes 109-1, the MAC bytes 111-1, or the message byte 104, as described below in further detail with reference to FIGS. 7A-7G. Alternatively, the tone position module 112 may insert the tone byte 113 byte between a first portion and a second portion of the nonce bytes 109-1; between a first portion and a second portion of the MAC bytes 111-1; or between a first portion and a second portion of the message byte 104, as described below in further detail with reference to FIGS. 7A-7G. As shown in FIG. 6, the tone position module 112 pseudo-randomly inserts the tone byte 113 between a first portion and a second portion of the MAC bytes 111-1, wherein the first portion of MAC bytes 111-1 is represented as MAC_1 Byte(s), and the second portion of MAC bytes 111-1 is represented as MAC_2 Byte(s). Alternatively, the tone position module 112 may insert the tone byte 113 at a fixed or random location that is selected based on service and/or characteristic attributes of the BLE communication protocol.

In some embodiments, the tone byte 113 may be any 8-bit value. In other embodiments, the tone byte 113 may be limited to certain 8-bit values. As an example, the tone byte 113 may have a limit regarding how many consecutive bits of the same value are present within the tone byte 113 in order to, for example, avoid introducing DC bias into the payload 114 (e.g., the tone byte 113 may not have more than five consecutive values of 1 and/or 0).

Subsequently, the CVM 14 may transmit the message packet 140, which includes the payload 114, a preamble byte (not shown), access address bytes (not shown), header bytes (not shown), and cyclical redundancy check bytes (not shown), to the tone remover module 128 of the PaaK module 49. The tone remover module 128 is configured to remove the tone byte 113 from the message packet 140 (i.e., execute a whitening algorithm on the payload 114 in order to remove the tone byte 113).

In response to removing the tone byte 113, the MAC comparator module 130 is configured to determine whether the MAC bytes 111-1 generated by the MAC generator 106 match MAC bytes 111-2 generated by the MAC generator 118 of the PaaK module 49. Additionally, the validation module 132 may determine whether the nonce bytes 109-1 match nonce bytes 109-2 generated by the nonce generator 108. If the validation module 132 determines that the nonce bytes 109-1, 109-2 match and receives an indication from the MAC comparator module 130 that the MAC bytes 111-1, 111-2 match, then the communication link 50 is authorized.

Moreover, if the validation module 132 determines that the nonce bytes 109-1, 109-2 match and the MAC comparator module 130 determines that the MAC bytes 111-1, 111-2 match, the validation module 132 may be configured to generate a reconstructed message packet 141, which includes all of the contents of the message packet 140 except for the tone byte 113. Accordingly, the validation module 132 may subsequently provide the reconstructed message packet 141 to the communication gateway 29. In other embodiments, the validation module 132 may solely transmit the message byte 104 to the communication gateway 29 if the validation module 132 determines that the nonce bytes 109-1, 109-2 match and the MAC comparator module 130 determines that the MAC bytes 111-1, 111-2 match.

With reference to FIGS. 7A-7G, example illustrations of the message packet 140 are shown. The message packets 140 may either be an advertising BLE packet or a data BLE packet, and a communication channel in which the message packet 140 is transmitted or received may vary based on the type of message packet (e.g., advertising BLE packets are only transmitted on channels 37-39 of the BLE communication protocol).

In some embodiments, the message packet 140 may include a preamble portion 142 (8 bits), an access address portion 144 (32 bits), a protocol data unit portion 146 (536 bits), and a cyclical redundancy check portion 148 (24 bits). When the message packet 140 is the advertising BLE packet, the access address portion 144 may have bit values that are uniform amongst all BLE-enabled devices (i.e., a common access address) in order to enable the discovery of the BLE-enabled devices. The protocol data unit portion 146 may include a header portion 150 (16 bits), which includes logical link identifier (LLID) bits, a next expected sequence number (NESN) bit, a sequence number (SN) bit, a more data (MD) bit, length bits, and bits that are reserved for future use (RFU). The LLID bits may indicate whether the message packet 140 includes data or control messages. The NESN and SN bits may represent a sequence number for acknowledgment and flow control. The MD bit may indicate whether the portable device 10 intends to send additional message packets 140 while the portable device 10 and the communication gateway 29 communicate via communication link 50. The length bits may represent the length of the payload 114.

Figure 7A:
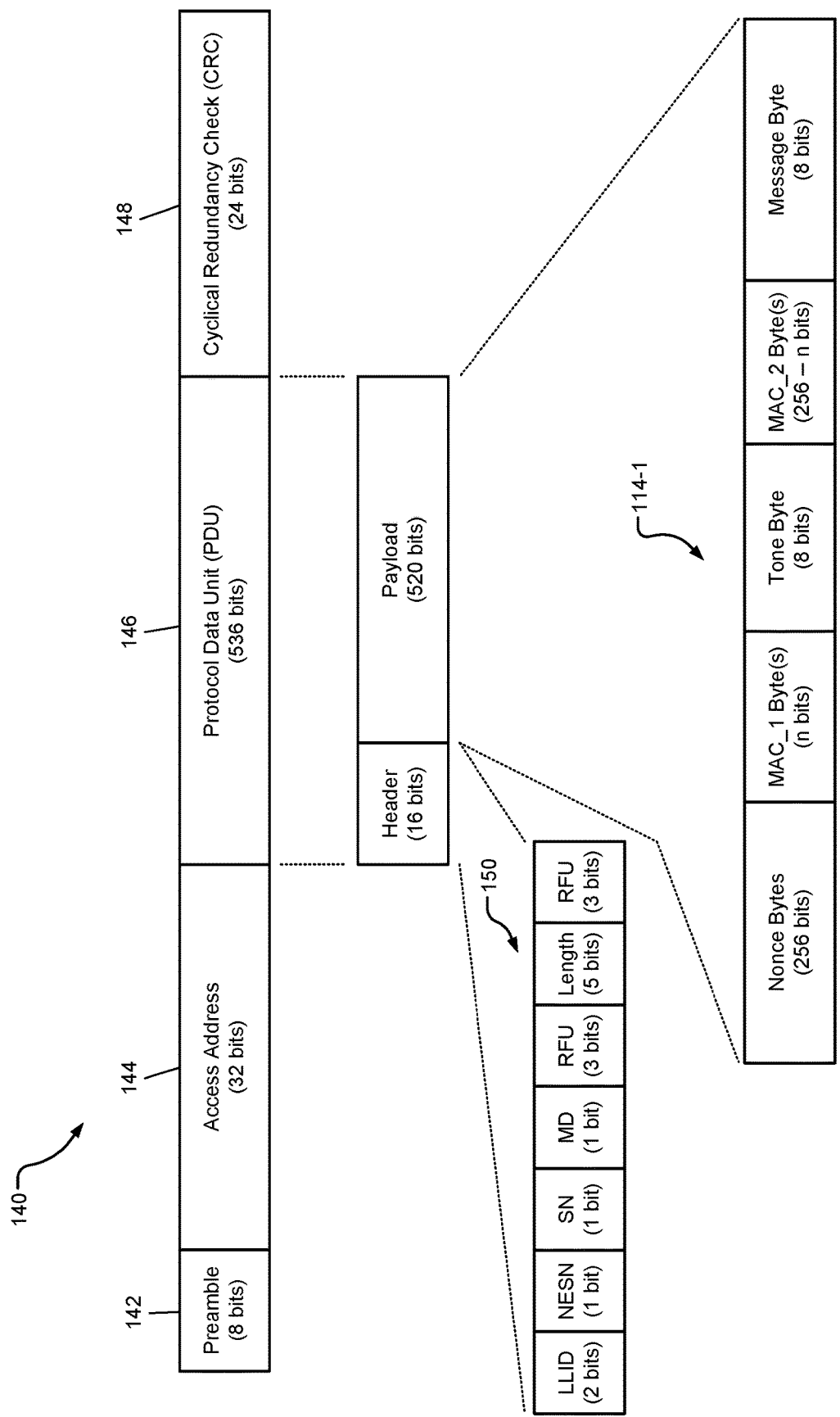
FIGS. 7A-7G illustrate example message packets according to the present disclosure.

As described above, the tone position module 112 is configured to, based on a second portion of the shared secret key 102 and the authenticated packet 110, generate and pseudo-randomly insert the tone byte 113 (e.g., a de-whitened tone byte) into the authenticated packet 110 in order to generate the payload 114. As an example and as shown in FIG. 6 and FIG. 7A, the tone position module 112 may insert the tone byte 113 between a first portion and a second portion of the MAC bytes 111-1 in order to generate payload 114-1, wherein the first portion of MAC bytes 111-1 is represented as MAC_1 Byte(s), and the second portion of MAC bytes 111-1 is represented as MAC_2 Byte(s).

Figure 7B:
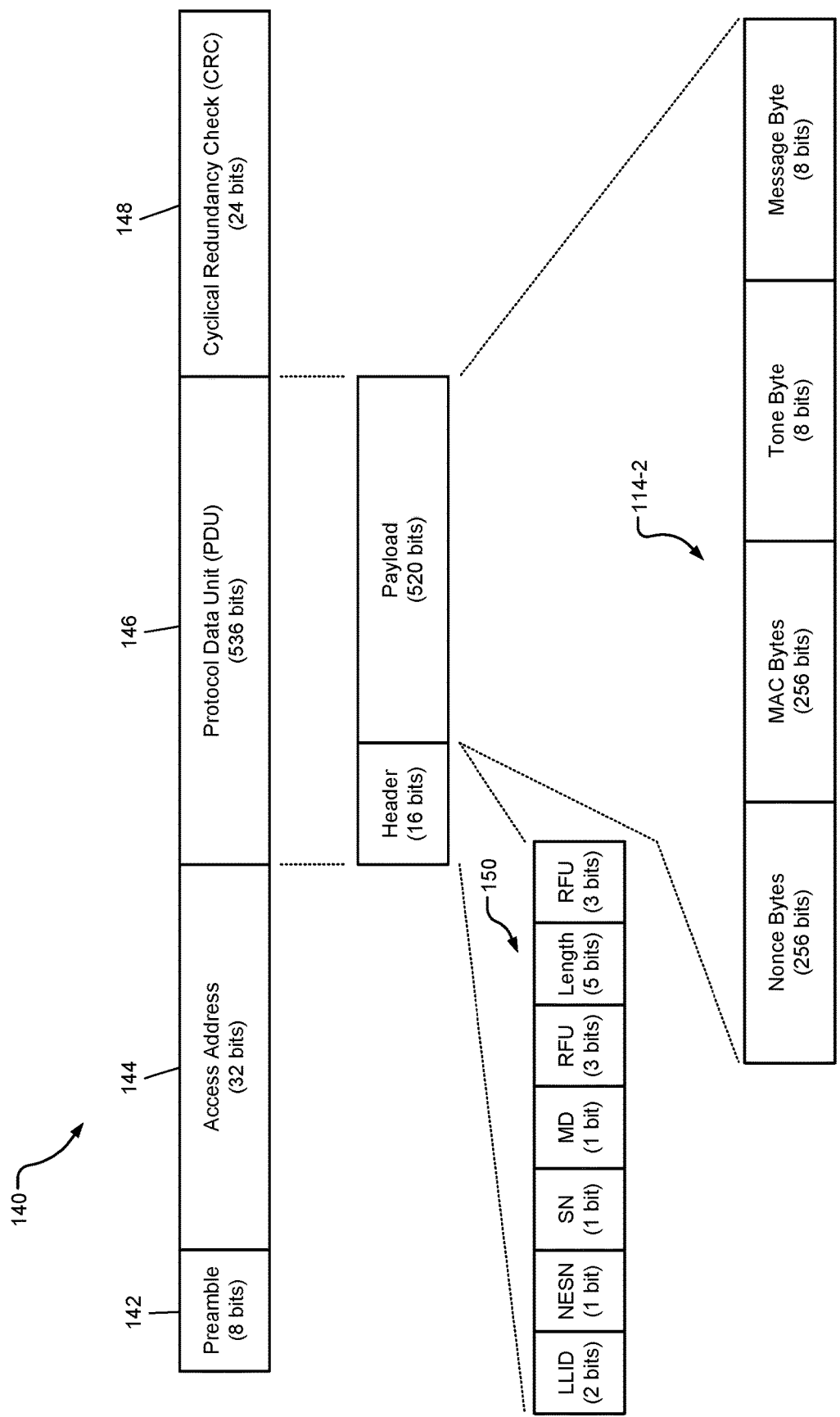
Figure 7C:
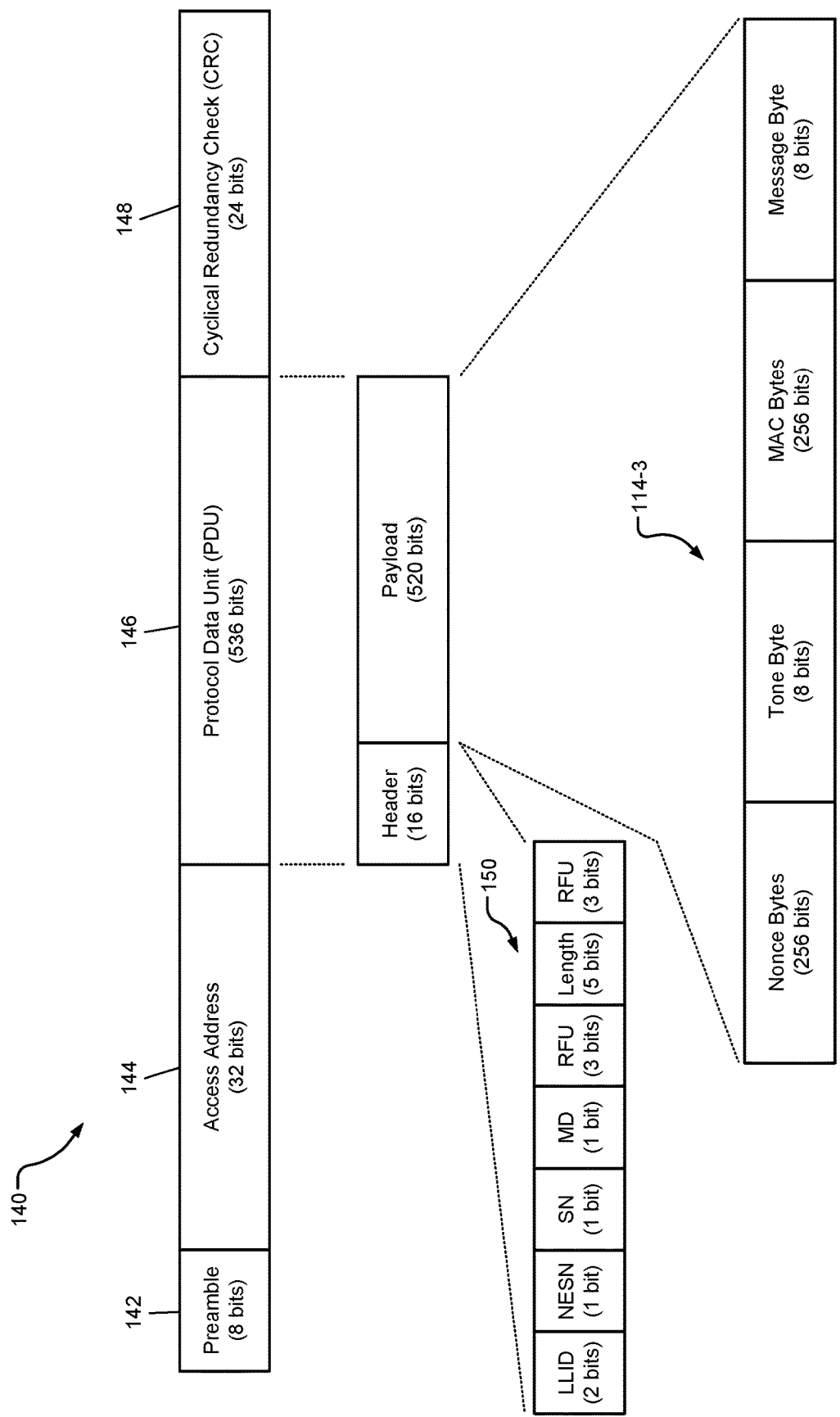

As another example and as shown in FIG. 7B, the tone position module 112 may insert the tone byte 113 between the MAC bytes 111-1 and the message byte 104 in order to generate payload 114-2. As shown in FIG. 7C, the tone position module 112 may insert the tone byte 113 between the nonce bytes 109-1 and the MAC bytes 111-1 in order to generate payload 114-3.

Figure 7D:
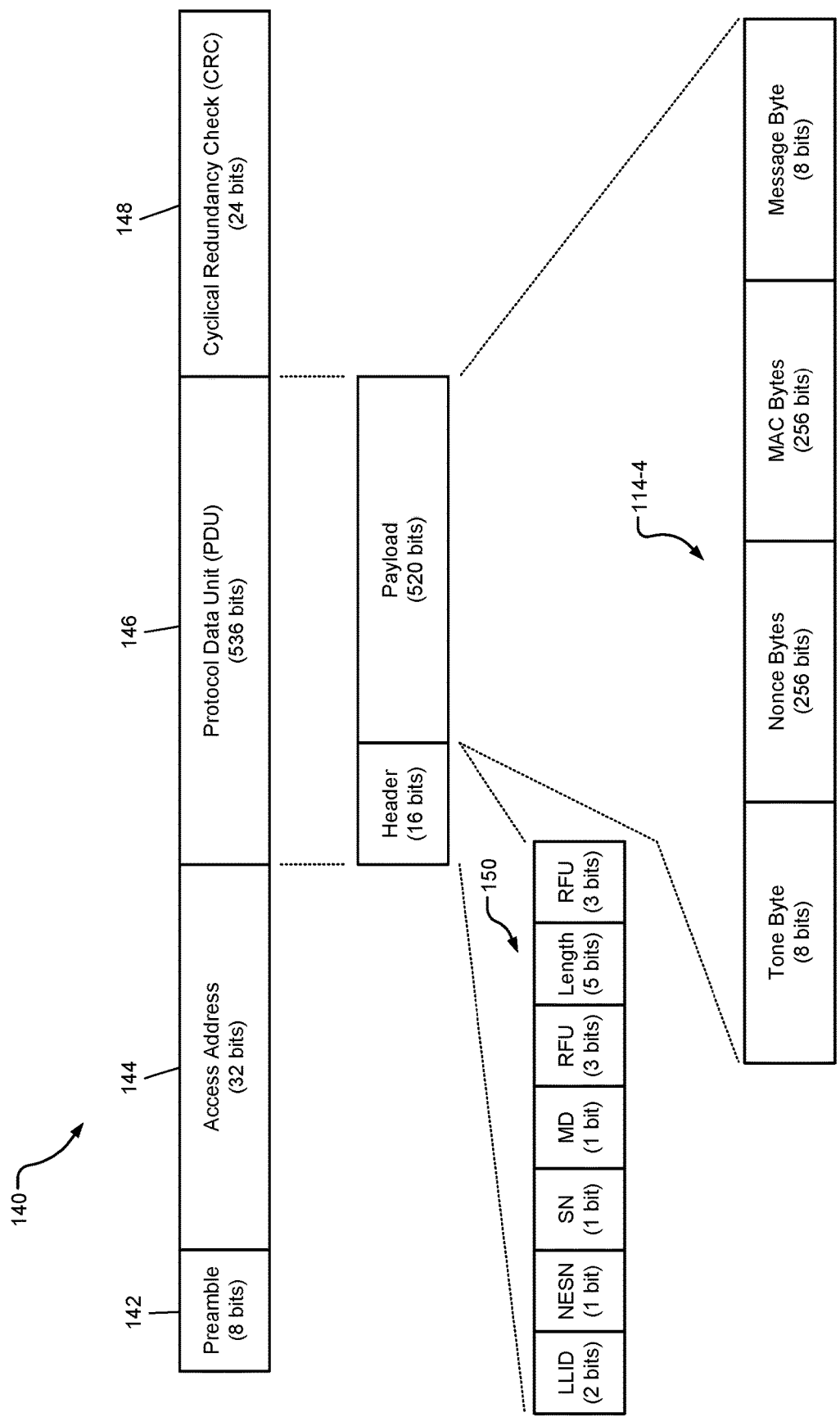
Figure 7E:
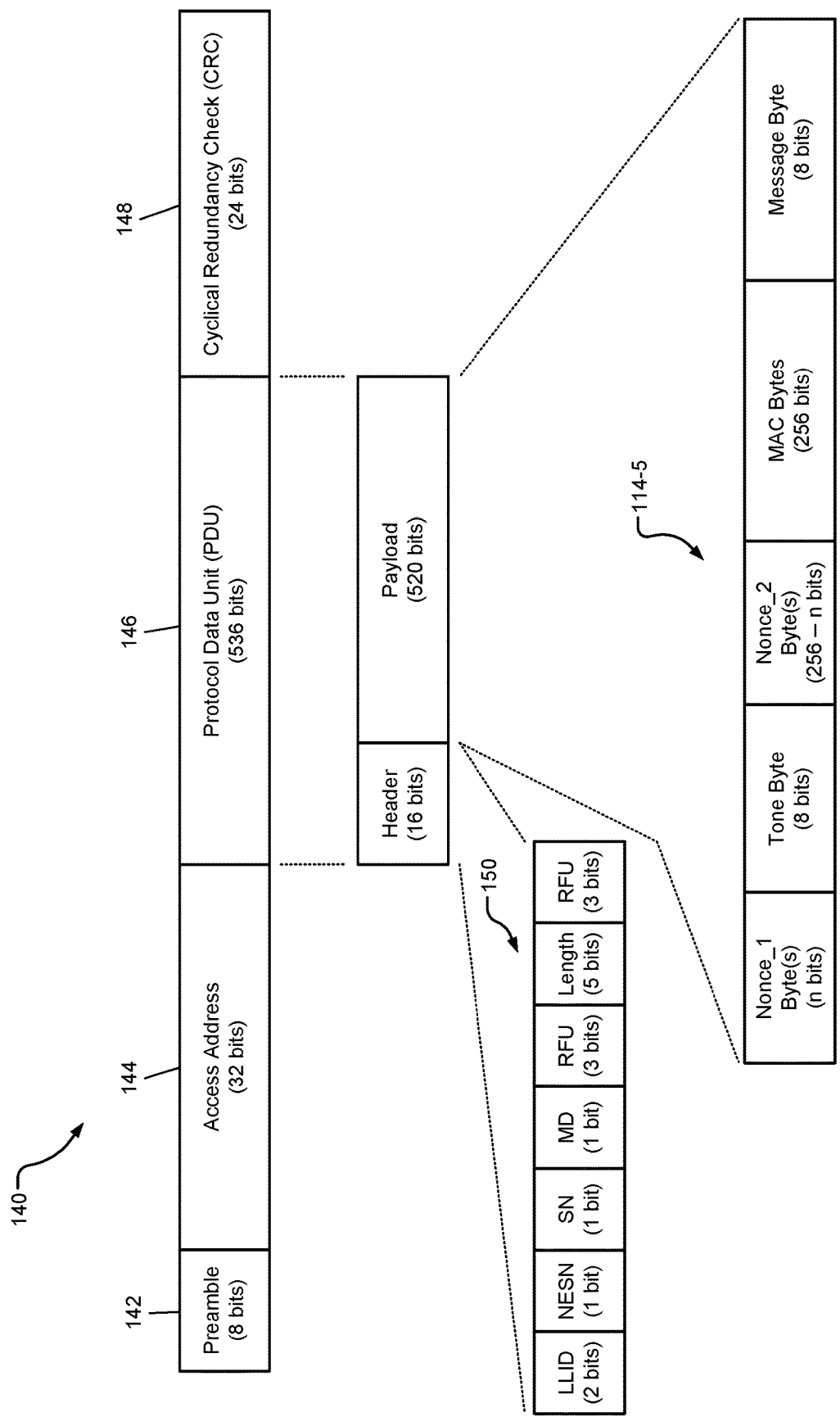

As another example and as shown in FIG. 7D, the tone position module 112 may insert the tone byte 113 before the nonce bytes 109-1 in order to generate payload 114-4. As shown in FIG. 7E, the tone position module 112 may insert the tone byte 113 between a first portion and a second portion of the nonce bytes 109-1 in order to generate payload 114-5, wherein the first portion of nonce bytes 109-1 is represented as Nonce_1 Byte(s), and the second portion of nonce bytes 109-1 is represented as Nonce_2 Byte(s).

Figure 7F:
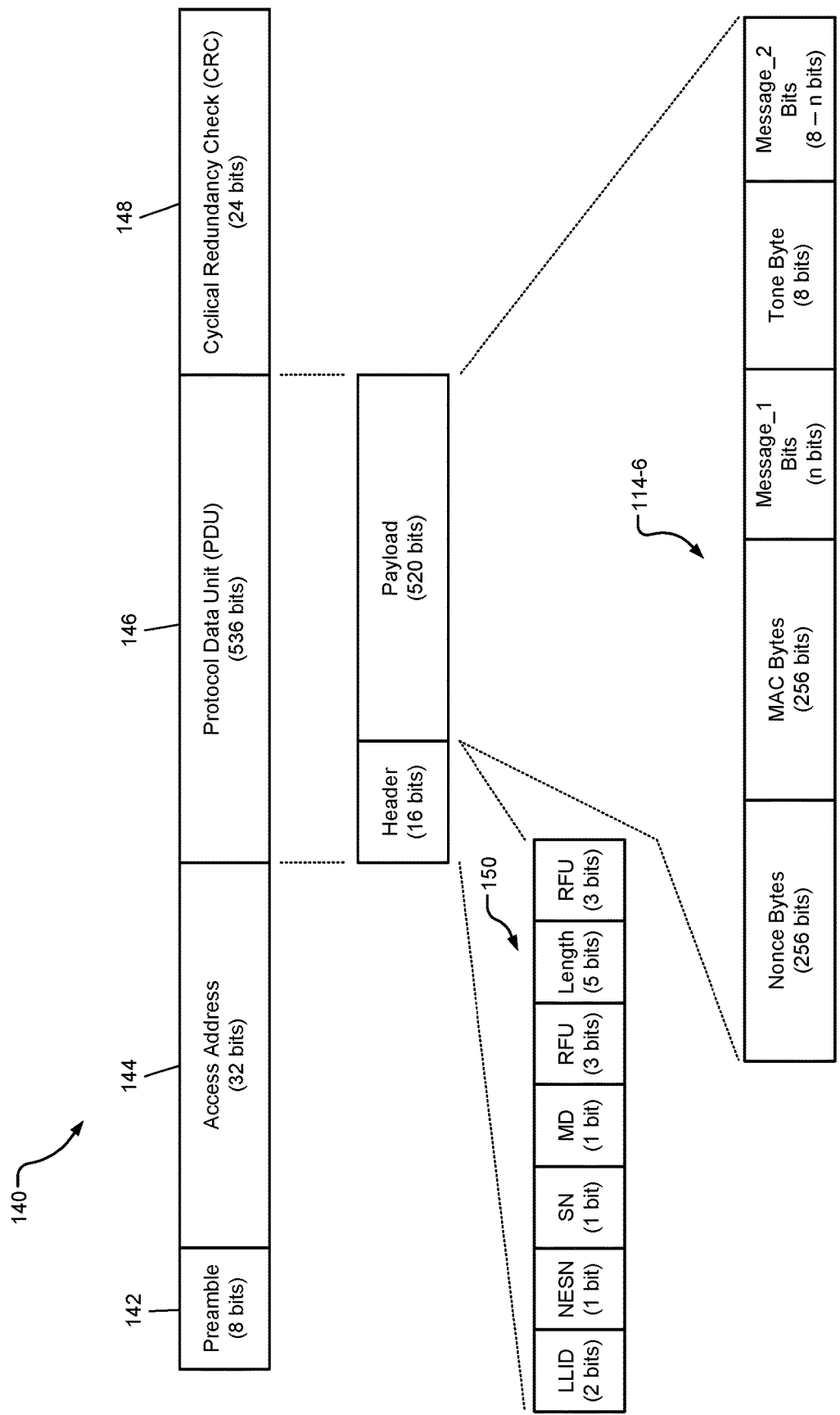
Figure 7G:
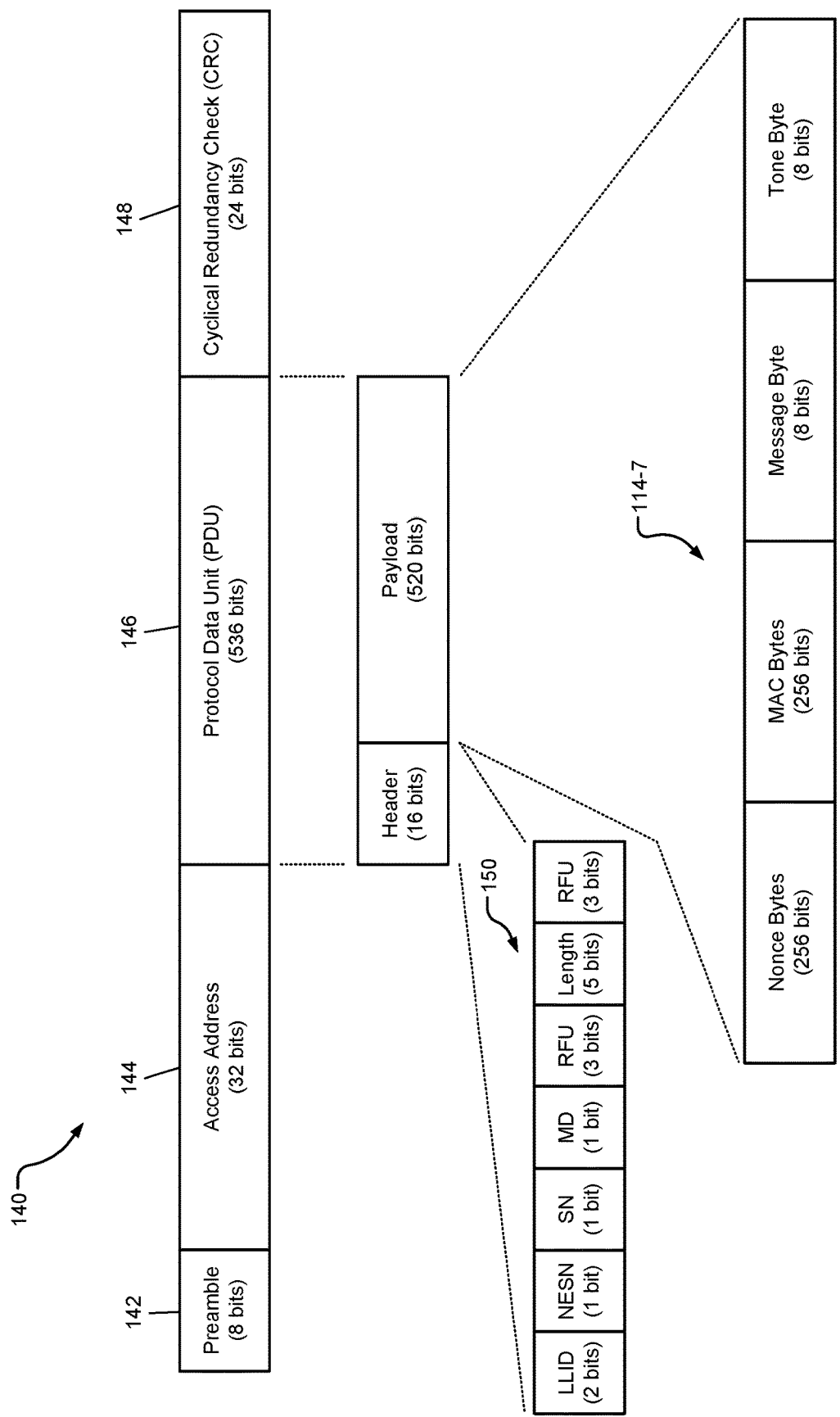

As another example and as shown in FIG. 7F, the tone position module 112 may insert the tone byte 113 between a first portion and a second portion of the message byte 104 in order to generate payload 114-6, wherein the first portion of message byte 104 is represented as Message_1 Bits, and the second portion of the message byte 104 is represented as Message_2 Bits. As shown in FIG. 7G, the tone position module 112 may insert the tone byte 113 after the message byte 104 in order to generate payload 114-7.

Figure 8:
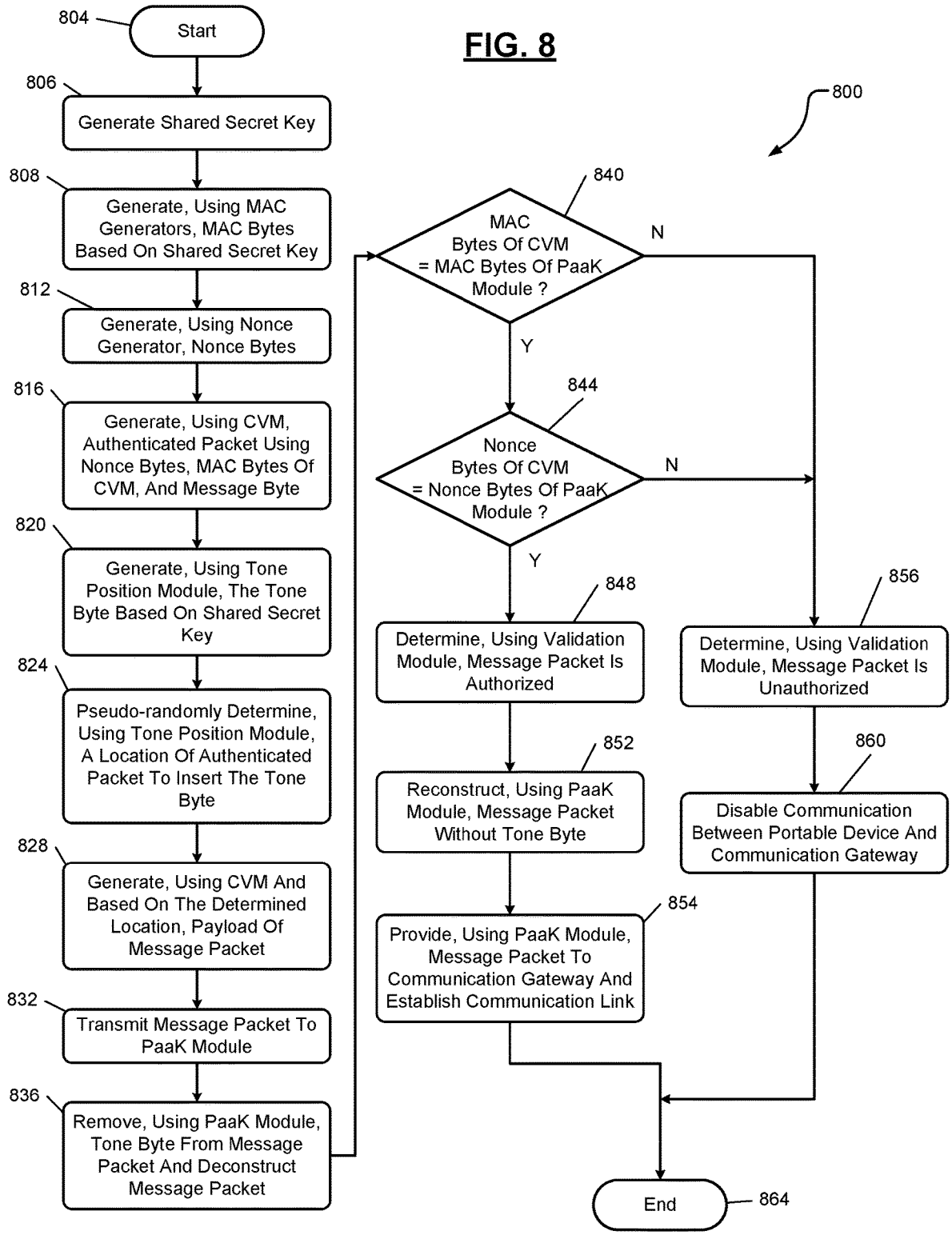

With reference to FIG. 8, a flowchart illustrating a control algorithm 800 for establishing the communication link 50 between the portable device 10 and the communication gateway 29 is shown. The control algorithm 800 begins at 804 when, for example, the portable device 10 is turned on and within a communication range of the communication gateway 29. At 806, the control algorithm 800 generates the shared secret key 102. At 808, the control algorithm 800 generates, using the MAC generators 106, 118, MAC bytes 111-1, 111-2 based on the shared secret key 102. At 812, the control algorithm 800 generates, using the nonce generator 108, nonce bytes 109-1, 109-2. At 816, the control algorithm 800 generates, using the CVM 14, the authenticated packed 110 using the nonce bytes 109-1, the MAC bytes 111-1, and the message byte 104.

At 820, the control algorithm 800 generates, using the tone position module 112, the tone byte 113 based on the shared secret key 102. At 824, the control algorithm 800 pseudo-randomly determines, using the tone position module 112, a location of the authenticated packet 110 to insert the tone byte 113. At 828, the control algorithm 800 generates, using the CVM 14 and based on the determined location, the payload 114 of the message packet 140. At 832, the control algorithm 800 transmits the message packet 140 to the PaaK module 49. At 836, the control algorithm 800 removes, using the PaaK module 49, the tone byte 113 from the message packet 140 and deconstructs the message packet 140 (i.e., the PaaK module 49 provides the MAC bytes 111-1 to the MAC comparator module 130 and provides the nonce bytes 109-1 to the validation module 132).

At 840, the control algorithm 800 determines, using the MAC comparator module 130, whether the MAC bytes 111-1 generated by the MAC generator 106 match the MAC bytes 111-2 generated by the MAC generator 118. If so, the control algorithm 800 proceeds to 844; otherwise, the control algorithm 800 proceeds to 856. At 844, the control algorithm 800 determines, using the validation module 132, whether the nonce bytes 109-1 match the nonce bytes 109-2 in order to, for example, verify that the PEPS system 1 is not being subjected to a replay attack. If so, the control algorithm 800 proceeds to 848; otherwise, the control algorithm 800 proceeds to 856. At 848, the control algorithm 800 determines, using the validation module 132, that the message packet 140 is authorized and then proceeds to 852. At 852, the control algorithm 800 reconstructs, using the validation module 132, the message packet 140 without the tone byte 113 (i.e., generates the reconstructed message packet 141). At 854, the control algorithm 800 provides, using the PaaK module 49, the reconstructed message packet 141 to the communication gateway 29, establishes the communication link 50, and then proceeds to 864.

At 856, the control algorithm 800 determines, using the validation module 132, that the message packet 140 is unauthorized and then disables communication between the portable device 10 and the communication gateway 29 at 860. At 864, the control algorithm 800 ends.

Figure 9:
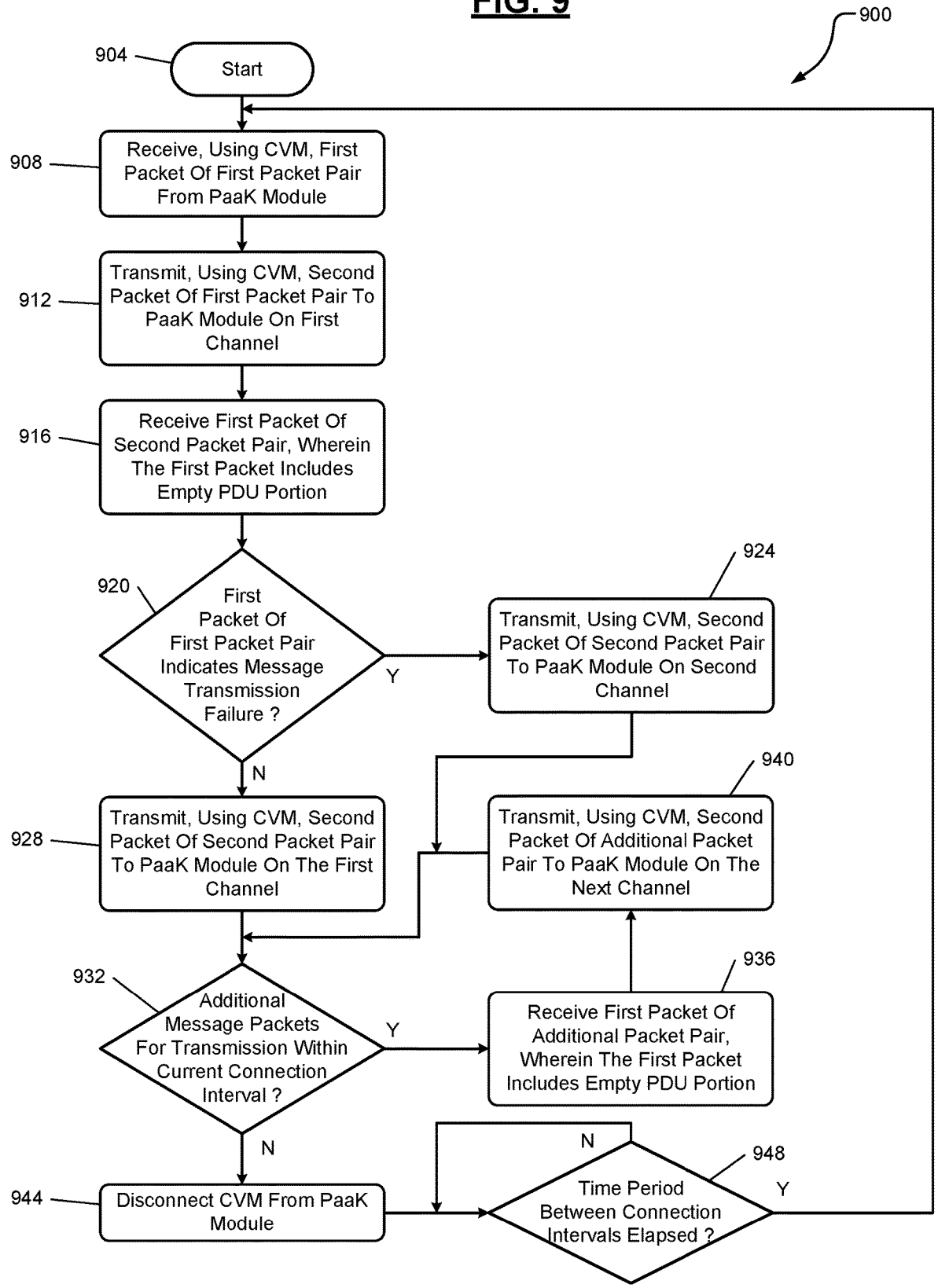

With reference to FIG. 9, a flowchart of an example control algorithm 900 illustrating a control loop between the portable device 10 and the vehicle 30 is shown. The control algorithm 900 begins at 904 when, for example, the portable device 10 is turned on and within a communication range of the communication gateway 29. At 908, the control algorithm 900 receives, using the CVM 14, a first message packet of a first packet pair from the PaaK module 49. At 912, the control algorithm 900 transmits, using the CVM 14, a second message packet of the first packet pair to the Paak module 49 on a first communication channel (e.g., one of BLE channels 1-39). Transmitting a message packet to the PaaK module 49 is described below in further detail with reference to FIG. 10.

At 916, the control algorithm 900 receives, using the CVM 14, a first message packet of a second packet pair, and the first packet of the second pair includes an empty protocol data unit (PDU) portion 146. At 920, the control algorithm 900 determines, using the CVM 14, whether the first message packet of the first packet pair indicates a message transmission failure. As an example, if the first message packet of the first packet pair indicates that it is behind by at least one channel, the CVM 14 may determine that it indicates a message transmission failure. If the CVM 14 indicates a message transmission failure, the control algorithm 900 proceeds to 924 and transmits, using the CVM 14, a second message packet of the second packet pair to the PaaK module 49 on a second communication channel and then proceeds to 932; otherwise, the control algorithm 900 proceeds to 928 and transmits, using the CVM 14, the second message packet of the second packet pair to the PaaK module 49 on the first communication channel and then proceeds to 932.

At 932, the control algorithm 900 determines, using wireless communication chipset 11, whether additional message packets for transmission are needed within the current connection interval. If so, the control algorithm 900 proceeds to 936; otherwise, the control algorithm 900 proceeds to 944. At 936, the control algorithm 900 receives, receives, using the CVM 14, a first message packet of an additional packet pair, and the first packet of the additional packet pair includes the empty PDU portion 146. At 940, the control algorithm 900 transmits, using the CVM 14, the second message packet of the additional packet pair to the PaaK module 49 on the next communication channel and then proceeds to 932. At 944, the control algorithm 900 disconnects the CVM 14 from the PaaK module 49. At 948, the control algorithm 900 determines whether a time period between connection intervals has elapsed (e.g., 50 ms). If so, the control algorithm 900 proceeds to 908; otherwise, the control algorithm 900 remains at 948 until the time period has elapsed.

With reference to FIG. 10, a flowchart of a control algorithm 1000 illustrating the transmission of a message packet to the PaaK module 49 is shown. The control algorithm 1000 begins at 1004 when, for example, control algorithm 900 executes one of steps 912, 928, 936, or 940.

At 1008, the control algorithm 1000 determines, using the CVM 14, a current communication channel of the connection interval (e.g., channel 16 of the BLE protocol). At 1012, the control algorithm 1000 generates, using the wireless communication chipset 11, a series of bits based on the current communication channel of the connection interval. At 1016, the control algorithm 1000 generates, using the wireless communication chipset 11 and based on the series of bits, the tone byte 113 using a whitening algorithm. As an example, the wireless communication chipset 11 may include a 7-bit linear feedback shift register (LFSR) circuit with a polynomial of $x^1+x^4+i$. The LFSR circuit may then apply an XOR function to the series of bits and the message packet 140 in order to generate the tone byte 113. In this way, both the function used to determine the tone byte 113 and the function used by the LFSR circuit to output the sequence of bits used to whiten the message packet 140 are based on the current communication channel. The functions are coordinated so that when the outputted series of bits is XORed with the message packet 140, the resulting whitened message packet includes a series of zeros or ones. At 1020, the control algorithm 1000 transmits, using the wireless communication chipset 11, the whitened message packet to the PaaK module 49 and then ends at 1024.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:
1. A method comprising:
generating, with a processor of a portable device, (i) first message authentication code (MAC) bytes based on a shared secret key, (ii) first nonce bytes, (iii) an authenticated packet based on the first MAC bytes, the first nonce bytes, and a message byte, and (iv) a de-whitened tone byte based on the shared secret key;
identifying, with the processor of the portable device, a location within the authenticated packet;
inserting, with the processor of the portable device, the de-whitened tone byte at the location within the authenticated packet;
generating, with the processor of the portable device, a message packet that includes the authenticated packet with the inserted de-whitened tone byte;
transmitting, with the processor of the portable device, the message packet to a peripheral device; and
establishing, with the processor of the portable device, a communication link between the portable device and the peripheral device in response to the peripheral device validating the message packet.

2. The method of claim 1, wherein the location is a predetermined fixed location within the authenticated packet and identifying the location is based on the predetermined fixed location.

3. The method of claim 1, wherein the location is a random location within the authenticated packet and identifying the location is performed by randomly selecting the location within the authentication packet.

4. The method of claim 1, wherein the location is based on at least one of service attributes and characteristic attributes of a Bluetooth Low Energy communication protocol.

5. The method of claim 1, wherein the de-whitened tone byte has less than a predetermined number of consecutive bits having a same bit value within the de-whitened tone byte.

6. The method of claim 1 further comprising:
generating, with a processor of the peripheral device, second MAC bytes based on the shared secret key
generating, with the processor of the peripheral device, second nonce bytes;
removing, with the processor of the peripheral device, the de-whitened tone byte from the authenticated packet of the message packet;
comparing, with the processor of the peripheral device, the first MAC bytes with the second MAC bytes and the first nonce bytes with the second nonce bytes; and
validating, with the processor of the peripheral device, the message packet in response to determining that the first MAC bytes match the second MAC bytes and that the first nonce bytes match the second nonce bytes.

7. The method of claim 6, further comprising:
determining, with the processor of the peripheral device, that the message packet is invalid in response to determining that at least one of the first MAC bytes do not match the second MAC bytes and the first nonce bytes do not match the second nonce bytes.

8. The method of claim 1, wherein the first nonce bytes are generated using a random number generator.

9. The method of claim 1, wherein the location is within the first MAC bytes.

10. The method of claim 1, wherein the location is within the first nonce bytes.

11. A system comprising a portable device configured to
generate, with a processor of the portable device, (i) first message authentication code (MAC) bytes based on a shared secret key, (ii) first nonce bytes, (iii) an authenticated packet based on the first MAC bytes, the first nonce bytes, and a message byte, and (iv) a de-whitened tone byte based on the shared secret key;
identify, with the processor of the portable device, a location within the authenticated packet;
insert, with the processor of the portable device, the de-whitened tone byte at the location within the authenticated packet;
generate, with the processor of the portable device, a message packet that includes the authenticated packet with the inserted de-whitened tone byte;
transmit, with the processor of the portable device, the message packet to a peripheral device; and
establish, with the processor of the portable device, a communication link between the portable device and the peripheral device in response to the peripheral device validating the message packet.

12. The system of claim 11, wherein the location is a predetermined fixed location within the authenticated packet and the processor of the portable device is configured to identify the location based on the predetermined fixed location.

13. The system of claim 11, wherein the location is a random location within the authenticated packet and the processor of the portable device is configured to identify the location by randomly selecting the location within the authentication packet.

14. The system of claim 11, wherein the location is based on at least one of service attributes and characteristic attributes of a Bluetooth Low Energy communication protocol.

15. The system of claim 11, wherein the de-whitened tone byte has less than a predetermined number of consecutive bits having a same bit value within the de-whitened tone byte.

16. The system of claim 11 further comprising the peripheral device, wherein the peripheral device is configured to:
generate, with a processor of the peripheral device, second MAC bytes based on the shared secret key
generate, with the processor of the peripheral device, second nonce bytes;
remove, with the processor of the peripheral device, the de-whitened tone byte from the authenticated packet of the message packet;
compare, with the processor of the peripheral device, the first MAC bytes with the second MAC bytes and the first nonce bytes with the second nonce bytes; and
validate, with the processor of the peripheral device, the message packet in response to determining that the first MAC bytes match the second MAC bytes and that the first nonce bytes match the second nonce bytes.

17. The system of claim 16, wherein the peripheral device is further configured to:
determine, with the processor of the peripheral device, that the message packet is invalid in response to determining that at least one of the first MAC bytes do not match the second MAC bytes and the first nonce bytes do not match the second nonce bytes.

18. The system of claim 11, wherein the first nonce bytes are generated using a random number generator.

19. The system of claim 11, wherein the location is within the first MAC bytes.

20. The system of claim 11, wherein the location is within the first nonce bytes.

* * * * *

UNITED STATES PATENT AND TRADEMARK OFFICE
CERTIFICATE OF CORRECTION

PATENT NO. : 10,956,343 B2  
APPLICATION NO. : 16/594196  
DATED : March 23, 2021  
INVENTOR(S) : Raymond Michael Stitt et al.

Page 1 of 1

It is certified that error appears in the above-identified patent and that said Letters Patent is hereby corrected as shown below:

In the Claims

Column 17, Claim 6, Line 19: after "key", insert --;--

Column 17, Claim 11, Line 44: after "to", insert --:--

Column 18, Claim 16, Line 29: after "key", insert --;--

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*